United States Patent Office 2,980,501
Patented Apr. 18, 1961

2,980,501

PROCESS FOR PURIFYING SPENT MERCERIZATION CAUSTIC

Ralph L. Carr, Towson, Md., and Charles R. Dulany, Niagara Falls, N.Y., assignors to Olin Mathieson Chemical Corporation, a corporation of Virginia No Drawing. Filed Dec. 31, 1957, Ser. No. 706,296

8 Claims. (Cl. 23—49)

This invention relates to the purification of aqueous caustic which contains colloidal and suspended organic matter. More particularly it relates to the purification of the aqueous caustic remaining after textile mercerization.

Textiles are commonly mercerized by passing them through about a 50 percent by weight aqueous solution of sodium hydroxide. The caustic remaining after the mercerization contains about 5 percent to 10 percent by weight of sodium hydroxide as well as up to 5 percent by weight of dissolved, colloidal and suspended impurities comprising mainly hemi-cellulose as well as pectins, waxes and dyes. This dilute solution is concentrated to 20 percent to 40 percent by weight sodium hydroxide by evaporation of water whereupon most of the dissolved impurities form further amounts of colloidal and suspended matter. The mixture thus becomes dark and syrupy and is not suitable for recycle to the mercerizer without purification. Prior purification procedures include dialysis and filtration, however neither of these is completely successful. Dialysis produces a clear, clean caustic solution; however it requires re-evaporation since dialysis causes considerable dilution of the caustic, i.e. the dialyzed solution contains only 10–15 percent by weight caustic. Furthermore, installation and operation of dialyzers is expensive. Filtration is not as effective as dialysis since substantially no colloidal material is removed, and the viscous mixture quickly clogs the filtering medium, thus requiring frequent changing or backwashing thereof. The colloidal matter accumulates in the caustic, increasing its viscosity until it is finally no longer useable.

In accordance with this invention, there is provided a simple, efficient and economical method for recovering the caustic values from spent mercerization caustic. This method involves treating the spent caustic, preferably after concentration by evaporation to between the range of about 20 percent to about 40 percent by weight sodium hydroxide content, with chlorine, sodium hypochlorite or calcium hypochlorite or a mixture thereof, heating the mixture and removing a clear caustic solution. As certain of the specific examples below illustrate, the treating step can be carried out while the spent caustic is heated.

According to the preferred embodiment of this invention, spent mercerization caustic, after concentration to between the range of about 20 percent to 40 percent by weight caustic, is treated with about 0.3 percent to 5 percent by weight, based on the weight of the caustic mixture, of chlorine at about 20° to 40° C. Although less economical, the same weight of sodium hypochlorite or calcium hypochlorite can be added to the mixture instead of chlorine. Within the above limits, a greater amount of treating chemical should be used when the degree of contamination is high while a lesser amount will suffice for a lesser degree of contamination.

Upon heating the mixture containing the treating chemical, the colloidal and suspended material flocculates and rises to the surface. The heating period and temperature are not critical, 10 to 30 minutes at 70° to 100° C. being generally preferred. The clear caustic solution can then be separated by any convenient method, for example, by tapping it from the bottom of the vessel, or by siphoning. If desired, further amounts of the purified caustic can be recovered by centrifuging the floc. Alternatively, both steps can be carried out at higher or lower temperatures, although a longer time is necessary to effect good separation of the floc below about 70° C. Boiling should be avoided since the turbulence prevents the floc separation.

The following examples further illustrate the process:

*Example I*

A sample of spent mercerization caustic was concentrated by evaporation to 270 grams of a dark-brown viscous suspension having a caustic content of 28.5 percent by weight. About 3.5 grams of chlorine were bubbled into this material at about 25° C., during which the color faded from a deep brown to a greyish-tan. After the chlorine was added, the mixture was heated at 85° C. for about 10 minutes. During the heating period the suspended and colloidal material flocculated and rose to the top one-half inch of the mixture, leaving three inches of clear, light-orange solution below it. After allowing the mixture to cool to about room temperature, the floc was skimmed off, leaving 246 grams of the caustic solution which contained about 26.4 percent by weight of sodium hydroxide. Thus, about 84 percent of the sodium hydroxide was recovered in the form of a solution suitable for further concentration, for example, by the addition of 76 percent by weight aqueous caustic and recycle to the mercerizer.

*Example II*

About 266 grams of a dark brown viscous mixture having a sodium hydroxide content of 28.5 percent by weight was obtained by evaporating most of the water from a sample of spent mercerization caustic having an initial sodium hydroxide content of about 7 percent by weight. To this mixture, at room temperature, there was added 1.9 grams of chlorine. The mixture was then heated at about 80° to 90° C. for 15 minutes, causing the solid and colloidal impurities to coagulate and rise to the surface. These were skimmed off, leaving 242.3 grams of caustic solution having a sodium hydroxide content of 27.8 percent by weight, containing 89 percent of the sodium hydroxide in the starting material. The coagulated material removed from the surface of the caustic was centrifuged to cause settling of the floc. About 12 grams of clear caustic was decanted. It contained about 3.3 grams of sodium hydroxide which brought the total recovery of the initial sodium hydroxide to over 93.5 percent.

*Example III*

Fifty grams of an aqueous solution containing 11 percent by weight of sodium hypochlorite was added at approximately 25° C. to 203 grams of evaporated spent caustic having a sodium hydroxide content of 32 percent by weight. The mixture was heated at 90° C. for 25 minutes whereupon the colloidal and suspended impurities rose to the surface. These were skimmed off to leave 228 grams of clear solution having a sodium hydroxide content of 24.5 percent by weight. In this way, 86 percent of the initial sodium hydroxide was recovered in a form suitable for concentration and recycle to the mercerizer.

*Example IV*

A mixture containing 105 grams of spent, concentrated mercerization caustic having a sodium hydroxide content of about 30 percent by weight and 3.0 grams of granular calcium hypochlorite, mixed at room temperature, was heated to about 90° C. The floc which immediately rose to the surface was skimmed off, and 82 grams of clear, yellow caustic solution was decanted from some undissolved calcium hypochlorite granules remaining in the beaker.

*Example V*

About 50 grams of spent, concentrated mercerization caustic, having a sodium hydroxide content of about 20 percent by weight, was heated to 95° C. and then 0.4 gram of granular calcium hypochlorite was added thereto. The suspended material flocculated and rose to the surface within 20 minutes. After skimming off the floc, about 41 grams of clear, yellow sodium hydroxide solution was decanted from a few undissolved calcium hypochlorite granules remaining in the beaker.

*Example VI*

Spent mercerization caustic was evaporated until it had a concentration of about 27 percent by weight of sodium hydroxide. About 1020 grams of this material was heated to 90° C. and 12 grams of chlorine was slowly bubbled therein. After the chlorine was added the temperature of the mixture was maintained at 90° C. for 30 minutes whereupon the floc rose to the surface and was skimmed off leaving about 870 grams of clear, yellow aqueous caustic in the beaker.

What is claimed is:

1. A method for the purification of spent mercerization caustic solution which has been concentrated to a sodium hydroxide content within the range from about 20 to about 40 percent by weight which comprises admixing the spent caustic solution with a material selected from the group consisting of chlorine, sodium hypochlorite and calcium hypochlorite and heating the mixture at a temperature below its boiling point whereby a lower, clear caustic solution layer and an upper layer containing flocculated impurities form, and separating the caustic solution layer from the upper layer.

2. The method of claim 1 wherein said material is chlorine.

3. The method of claim 1 wherein said material is sodium hypochlorite.

4. The method of claim 1 wherein said material is calcium hypochlorite.

5. A method for the purification of spent mercerization caustic solution which has been concentrated to a sodium hydroxide content within the range from about 20 to about 40 percent by weight which comprises admixing the spent caustic solution at a temperature within the range from about 20° C. to about 40° C. with from about 0.3 to about 5 percent by weight, based on the weight of the spent caustic solution, of a material selected from the group consisting of chlorine, sodium hypochlorite and calcium hypochlorite, heating the mixture at a temperature within the range from about 70° C. to about 100° C. whereby a lower, clear caustic solution layer and an upper layer containing flocculated impurities form, and separating the caustic solution layer from the upper layer.

6. The method of claim 5 wherein said material is chlorine.

7. The method of claim 5 wherein said material is sodium hypochlorite.

8. The method of claim 5 wherein said material is calcium hypochlorite.

References Cited in the file of this patent

UNITED STATES PATENTS 2,632,732　　Steel et al. _____ Mar. 24, 1953